United States Patent

[11] 3,588,361

[72] Inventor Jean Louis Hurault
17 Rue, Bouilloux Lafont, Paris 15e, France
[21] Appl. No. 807,678
[22] Filed Mar. 17, 1969
[45] Patented June 28, 1971
[32] Priority Mar. 15, 1969
[33] France
[31] 144083

[54] SYSTEM INCLUDING SUPPLEMENTARY TELEPHONE EXCHANGE EQUIPMENT

20 Claims, 3 Drawing Figs.

[52] U.S. Cl. .......... 179/2.5, 179/15
[51] Int. Cl. .......... H04h 1/08, H04j 1/00
[50] Field of Search .......... 179/15, 25; 178/58, 59, 60, 61, 54, 55, 56, 57

[56] References Cited
UNITED STATES PATENTS
3,491,207 1/1970 Birck .......... 179/15
3,510,584 5/1970 Krasin et al. .......... 179/2.5

*Primary Examiner*—Kathleen H. Claffy
*Assistant Examiner*—William A. Helvestine
*Attorney*—Craig, Antonelli, Stewart and Hill ABSTRACT: Simplified carrier current system providing an additional connection on a subscriber line, operating in amplitude modulation mode, in which the carrier frequency in the subscriber-exchange direction is synchronized with the frequency in the exchange-subscriber direction. In the additional extension set, ringing is obtained by a loudspeaker fed by an oscillator. Current consumption of the setup is zero under standby conditions and low in operation.

SYSTEM INCLUDING SUPPLEMENTARY TELEPHONE EXCHANGE EQUIPMENT

The invention relates to a device for providing a duplex telephone connection, and is particularly, but not exclusively, applicable to doubling the capacity of an existing telephone line connecting a subscriber to a telephone exchange.

By connecting a device in accordance with the invention in parallel with a line carrying telephone signals at voice frequencies between a subscriber and an exchange, it is possible to set up a supplementary duplex connection between the exchange and a supplementary subscriber, with a carrier current at a frequency $F_1$ in the direction from the exchange to the supplementary subscriber, and a carrier current at frequency $F_2$ in the opposite direction.

Installations such as this have been proposed, but have encountered practical disadvantages, principally concerning their power consumption.

The use of carrier current equipment in the supplementary station necessitates a local supply of electrical power, and it has been proposed to provide the supplementary station with a rectifier and to supply it with current from a mains supply. Such a rectifier may be heavy and bulky, and its use requires a connection between the telephone station and the mains, which may be prohibited for reasons of security.

It is preferable to supply the required electrical power from an accumulator kept charged by a voltage carried by the telephone line. It is imperative in this case for the charging current supplied by the line to be kept within preselected limits.

The current supplied 35 a telephone line on standby, that is when ready to make or take a call, is normally zero. When the subscriber makes a call, by dialing for example, he sends dialing signals in the form of trains of current pulses through the line. The dialing signals consist, for example, of pulses of amplitude 35 milliamperes separated by periods of zero current. If the line supplies a permanent current of $x$ milliamperes, the current in the line does not pass from 35 milliamperes to zero, but from 35 milliamperes to $x$ milliamperes. If $x$ is too large, a self-commutating relay in the exchange may function incorrectly, and the dialing signal pulses may be transmitted inaccurately.

It is therefore necessary for the permanent line current to be as low as possible, a direct consequence of which is the necessity to reduce the power consumption of the supplementary station, both when functioning and when on standby. If this condition is not obtained, either the subscriber line is loaded with an unacceptable permanent charging current, or the possible duration of operation of the supplementary station is too short.

To obtain good reception quality, it is necessary to establish a relationship between the carrier frequencies used for transmission in respective opposite directions.

Interference may occur between $F_1$ and its harmonics and $F_2$ and its harmonics, resulting in generation of interference frequencies in the voice frequency band which may lead to considerable reduction in the quality of reception.

The invention is intended to provide a supplementary connection over a subscriber telephone line in which the disadvantages of excessive power consumption of the supplementary station and generation of interference frequencies are reduced.

In accordance with a first aspect of the invention there is provided a telecommunication system including first and second stations communicating over a telephone line by transmission of voice frequencies, and supplementary third and fourth stations communicating over the same telephone line by transmission of voice-modulated first and second carrier frequencies, in which system the fourth station is arranged to present an impedance to the telephone line which is switchable from a relatively high value when the fourth station is on standby to relatively low values when the fourth station is dialed or in use, switching when the fourth station is dialed and on standby being effected in response to the sensing of carrier modulation significant of an incoming dialing signal providing an indication denoting an incoming call, while when the fourth station is to make a call or receive a call switching is effected by a call-control switch.

In accordance with a second aspect of the invention there is provided a supplementary station for a telecommunication system including first and second stations communicating over a telephone line by transmission of voice frequencies, which supplementary station includes a filter at a line-connection end for accepting carrier frequencies and rejecting the voice frequencies and is arranged to present an impedance to the telephone line which is switchable from a relatively high value when the supplementary station is on standby to relatively low values when the supplementary station is dialed or in use, switching when the supplementary station is dialed when on standby being effected in response to the sensing of carrier modulation significant of an incoming dialing signal providing an indication denoting an incoming call, while when the supplementary station is to make a call or receive a call switching is effect by a call-control switch.

In accordance with a third aspect of the invention there is provided supplementary exchange equipment for a telecommunication system including first and second stations communicating over a telephone line by transmission of voice frequencies, which supplementary exchange equipment includes filter circuitry for accepting carrier frequencies and rejecting the voice frequencies.

Using the invention it is possible to switch a current drawn by the fourth station between a relatively low value of, for example, 2 milliamperes when the fourth station is on standby and relatively high values of, for example, 8 milliamperes when the fourth station is making or taking a call and 16 milliamperes when the fourth station is dialed by the exchange.

The invention will now be described in greater detail by way of example, with reference to the accompanying diagrammatic drawings, in which.

Figure 1:
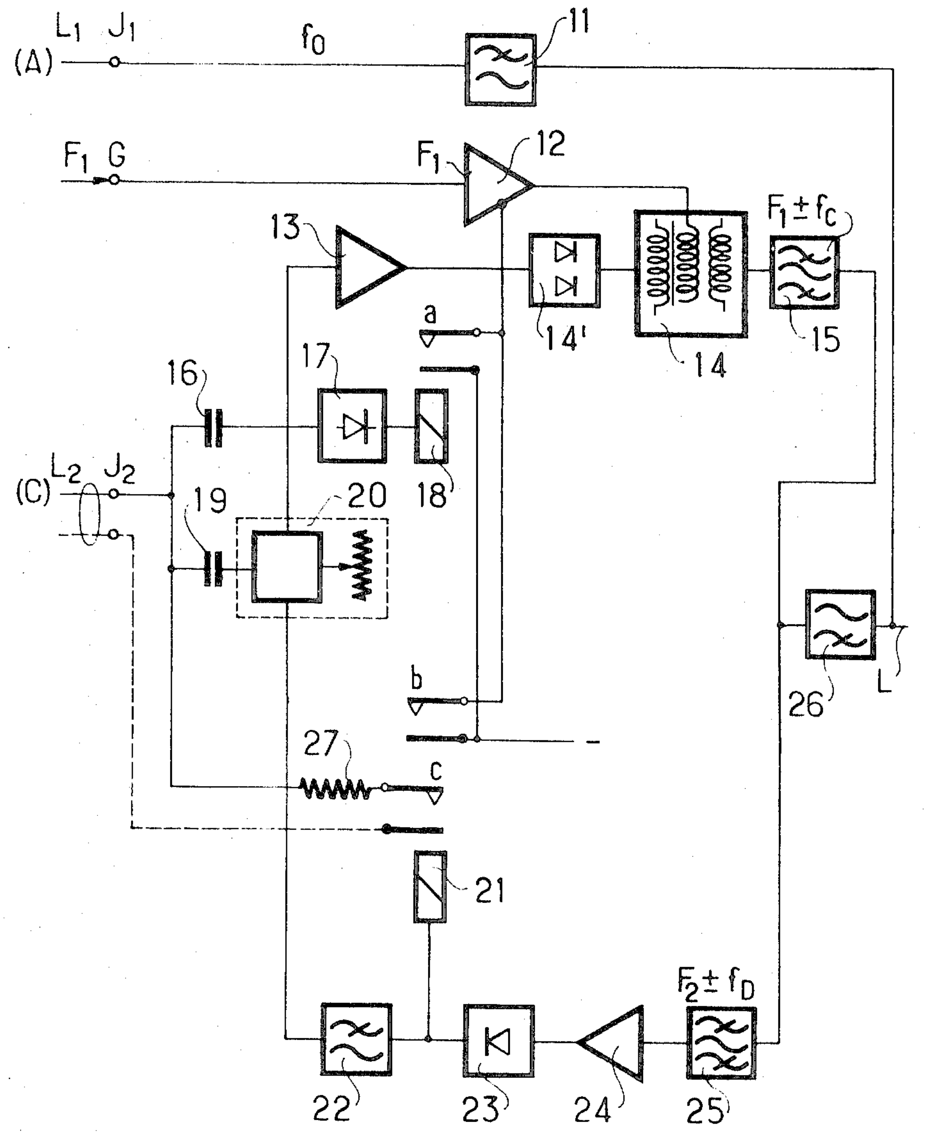
FIG. 1 is a block diagram of supplementary exchange equipment for providing a supplementary connection in a subscriber telephone line.
Figure 2:
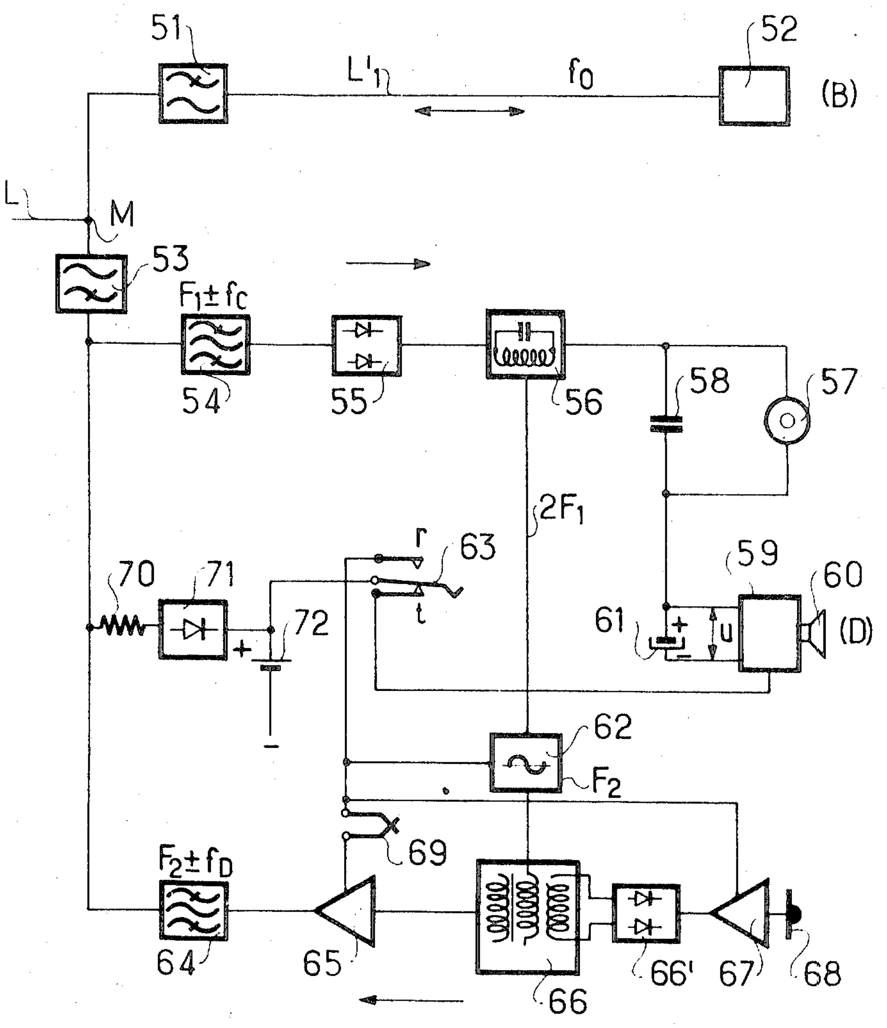
FIG. 2 is a diagram of a corresponding supplementary subscriber station.

Looking to FIGS. 1 and 2, subscribers A and B are connected at voice frequencies, the spectrum of voice frequencies circulating between these subscribers being designated $f_o$. Subscribers C and D are connected by carrier currents, and the connection of C to D is made at a carrier frequency $F_1$, transmitting a voice frequency band $f_C$. The connection of D to C is made at a carrier frequency $F_2$, transmitting a voice frequency band $f_D$. The connections are provided by amplitude modulation of the carriers. The frequency band transmitted in one direction is $F_1 \pm f_C$, and that transmitted in the other direction is $F_2 \pm f_D$.

Referring particularly to FIG. 1, subscriber A is connected by a line $L_1$ to a point $J_1$. A low pass filter 11 is connected between the point $J_1$ and one end of a subscriber line L.

A carrier current at a frequency $F_1$ (12 kHz.) is supplied by a source in the exchange to a point G connected to the input of an amplifier 12. This current passes to the line L via a transformer 14, a pass band filter 15 and a high pass filter 26. The transformer 14 has three windings.

The carrier frequency $F_1$ is amplitude modulated by the band of voice frequencies $f_C$ applied by subscriber C via a line $L_2$ to a point $J_2$. The modulation of the frequency $F_1$ is carried out by the transformer 14 and a system of rectifiers 14′. The transformer 14 is connected to the point $J_2$ via a capacitor 19, a termination element 20 and an amplifier 13.

Call signalling or dialing signal currents reaching the point $J_2$ via the line $L_2$ also pass through a capacitor 16 and are rectified by a rectifier 17 which applies sawtooth currents to a first relay 18. Contacts $a$ of the relay 18 then operate and are arranged to supply electrical power to the amplifier 12.

Signals received by the exchange via the line L, either at the carrier frequency $F_2$ or in the modulated band $F_2 \pm f_D$, pass through the high pass filter 26 and a filter 25 having a passband of $(F_2 \pm f_D)$, and are amplified by an amplifier 24. At the output of amplifier 24 the amplified signals are rectified by a rectifier 23 functioning as a detector. The detected voice signals pass through a low pass filter 22 to the termination element 20, and from there to the line $L_2$ via the capacitor 19.

The continuous carrier frequency component of the current detected at the output of the rectifier 23 operates a second relay 21 having two pairs of contacts *b* and *c*. The contacts *b* are connected in parallel with the contacts *a* of relay 18. The presence of the carrier frequency $F_2$ closes the contacts *b* and ensures the supply of power to the amplifier 12, and accordingly the connection of the frequency $F_1$ from the exchange to line L.

The contacts *c* of the relay 21 ensure, under the same conditions, the looping of the line $L_2$ through a resistor 27. By this looping, dialing signal pulses transmitted via the line L may be transmitted to the exchange. To show this looping facility the line $L_2$ has been shown as a double line.

Referring to FIG. 2, voice frequency signals issuing from the line L pass through a low pass filter 51 and are connected to a station 52 of the subscriber B by a line $L_1'$. The signal currents emitted by the station 52 follow the reverse path.

The carrier frequency signal currents issuing from the line L are separated by a high pass filter 53. From there they pass to a filter 54 with a passband of $F_1 \pm f_C$, at the output of which they are rectified by a full wave rectifier 55, and passed to an element 56 including a tuned circuit arranged to resonate at a frequency 2 $F_1$. The resonance voltage of the tuned circuit does not prevent it passing lower frequency signals, which include voice frequency signals energizing an ear piece 57 of the supplementary station which earpiece is shunted by a capacitor 58, and a direct current component providing a voltage *u* for unblocking an 800 Hz. oscillator 59 which is arranged to energize a loudspeaker 60 and which is shunted by a high capacitance 61. In the absence of the unblocking voltage *u* the oscillator 59 does not operate.

An oscillator 62 provides a frequency $F_2$ in the region of 2 $F_1$, and is synchronized to 2 $F_1$, via a connection indexed "2 $F_1$," by the circuit 56. Current at the frequency $F_2$ is applied by a transformer 66 having three windings to an amplifier 65, and rejoins the line L via a filter 64 having a passband $(F_2 \pm f_D)$.

This current is amplitude modulated in the transformer 66 and rectifiers 66' by microphonic currents generated by a microphone capsule 68 of the subscriber D and amplified by an amplifier 67. The microphone capsule 68 includes a relatively sensitive, high-impedance loudspeaker functioning without a direct polarizing current.

The current supply of the supplementary station in provided by an accumulator 72 which is held charged via the line L, a resistor 70 and a system of rectifiers 71 which prevent reversal of the charging voltage polarity. A negative terminal N of the accumulator 72 is connected to a point at earth potential, and the positive terminal P is connected to a moving contact of a two-way inverter or call-control switch 63 which has a fixed contact *t* which contacts the moving contact when the station D is on standby and a fixed contact *r* which contacts the moving contact when the station D is making or taking a call.

When the station is on standby and ready to accept a call switch 63 is able to supply current to the oscillator 59. When the station is making or taking a call the switch 63 supplies current to the amplifier 67, and also via a contact 69 to the amplifier 65. The contact 69 is a dial contact of the supplementary station D, and the switch 63 is operated by lifting and replacing a handset of the station D.

The operation of the system shown in FIGS. 1 and 2 will now be described with reference to those FIGS. Connection between subscribers A and B takes place over the telephone line L at voice frequency transmittable between point $J_1$ and station 52 through filters 11 and 51.

When subscriber D is called by subscriber C, the latter produces calling or dialing signals in the form of current pulses which pass to the relay 18 to apply pulses of power to the amplifier 12. Trains of pulses of the first carrier frequency $F_1$ thus pass to the line L in synchronism with the dialing signals produced by subscriber D, and pass to the supplimentary station where they are rectified and filtered to supply trains of pulses of the voltage *u* for unblocking the oscillator 59. The loudspeaker 60 forms a warning device for attracting the attention of the fourth station subscriber D, and is energized in synchronism with the dialing signals emitted by the third station.

When subscriber D lifts his handset and operates switch 63, the oscillator 59 is no longer supplied with current by the accumulator 72, and the oscillator 62 together with the amplifiers 67 and 65 are energized instead. By speaking into his microphone 68, the subscriber D sends a message to the subscriber C by modulating the carrier frequency $F_2$.

The unsynchronized frequency $F_2$ is passed to the line L, and received at the exchange via elements 26, 25, 24 and 23. The relay 21 is energized and the contacts *b* ensure the continuous supply of the amplifier 12. The frequency $F_1$ is thus supplied continuously to the line L. At the same time the contacts *c* operate a relay of the station C and cause current to pass in its microphone.

The frequency $F_1$ received in the supplementary station is doubled by rectifier 55, and the component 2 $F_1$ is filtered out by element 56, which applies it as a synchronization signal to the oscillator 62, which thereafter supplies a frequency of $F_2$ which is equal to 2 $F_1$. Conversation takes place at the carrier frequency $F_1$ in the direction C to D, at the carrier frequency 2 $F_1$ in the direction D to C.

When he wishes to call subscriber C, the subscriber D starts up the emission of unsynchronized frequency $F_2$ by lifting his handset. This operates the relay 21, and synchronization takes place very rapidly as this starts emission of the frequency $F_1$ and provides the synchronizing signal from element 56 almost immediately.

By dialing on his dial 69, the subscriber D causes interruptions of the frequency $F_2$. As a result the contacts *c* of the relay 21 reissue the dialing pulses on the line $L_2$, as the contacts *c* of this relay open and close in synchronism with the operation of the dial contact 69. When C has in turn removed the handset from his set, conversation takes place between C and D.

Figure 3:
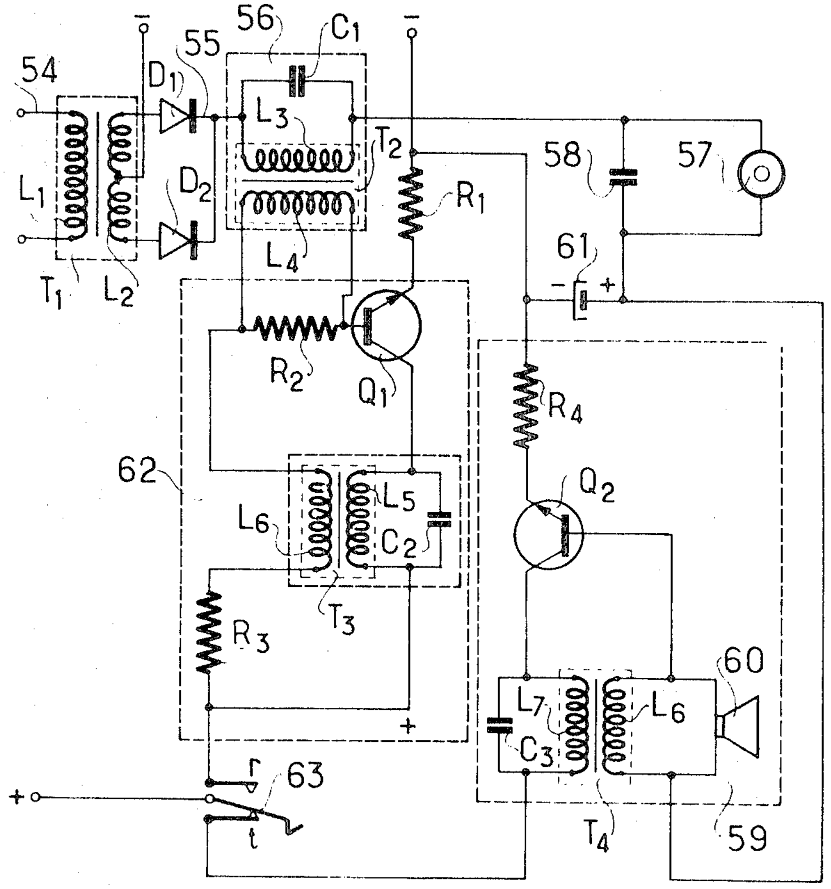
FIG. 3 is a more detailed diagram of part of the supplementary station shown in FIG. 2.

Referring to FIG. 3, the connection between filter 54 and rectifier 55 is made by a transformer $T_1$ having windings $L_1$ and $L_2$, the latter having a center tap. The rectifier circuit 55 includes two diodes $D_1$ and $D_2$ connected to a common point. The element 56 includes a transformer $T_2$, with a primary winding $L_3$, which is supplied with current by rectifier 55 and is tuned to a frequency 2 $F_1$ by a shunt capacitor $C_1$.

The oscillator 62 includes a transistor $Q_1$ with its emitter connected to the terminal N by a resistor $R_1$. Its base is connected to a resistor $R_2$ shunting a secondary winding $L_4$ of the transformer $T_2$, and connected in series with a winding $L_6$ of a transformer $T_3$. The other winding $L_5$ of transformer $T_3$ is tuned to a frequency $F_2$ by a shunt capacitor $C_2$ and is connected between the collector of the transistor $Q_1$ and the contact *r* of the switch 63. A resistor $R_3$, connected between the contact *r* and the winding $L_6$ provides biassing of the base of transistor $Q_1$.

In the oscillator 59, a transistor $Q_2$ has its emitter connected to the terminal N via a resistor $R_4$. The collector is connected to the contact *t* of the switch 63 via a winding $L_7$ of a transformer $T_4$, shunted by a capacitor $C_3$. The other winding $L_6$ of the transformer $T_4$ is connected in series with the earpiece 57, which is also connected to the winding $L_3$. The earpiece 57 is shunted by the capacitor 58, and a large value capacitor 61 is connected between the negative supply terminal N and the earpiece 57. The loudspeaker 60 is connected to the winding $L_6$.

When the handset is in position, the collector of the transistor $Q_2$ is connected to the positive supply terminal P. As the base of the transistor $Q_2$ is connected to the negative terminal N via a high resistance, namely the reverse impedance of diodes $D_1$ and $D_2$, the emitter/base junction is closed, and the transistor $Q_2$ is cut off and does not supply any current. As the oscillator 62 is not supplied with current, it also does not operate.

As there is no other active component in the supplementary station, the power consumption of the station on standby or alert is zero. In addition, by signalling through oscillator 59 and loudspeaker 60 it is possible to achieve a considerable economy in current consumption over signalling by ringing, in the usual way.

I have shown and described an embodiment in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are obvious to one of ordinary skill in the art.

I claim:

1. In a telecommunication system including first and second stations communicating over a telephone line by transmission of voice frequencies, the improvement comprising:

supplementary third and fourth stations for communicating over said telephone line by transmission of voice modulated first and second carrier frequencies, respectively;

said fourth supplementary station including control means arranged to present an impedance to said telephone line which is switchable from a relatively high standby value to a relatively low operating valve;

said control means including first means for switching said fourth supplementary station from said high impedance state to said low impedance state in response to the sensing of carrier modulation significant of an incoming dialing signal and call control switch means for switching said fourth supplementary station from said high impedance state to said low impedance state upon manual activation to make or receive a call.

2. A system as defined in claim 1 wherein said third station is connected to said telephone line via supplementary exchange equipment.

3. A system as defined in claim 1 wherein said first means includes a call-reception switching circuit operated in response to the sensing of an incoming dialing signal.

4. A system as defined in claim 3 wherein said call control switch means includes a telephone hookswitch.

5. A system as defined in claim 4 wherein said first means includes a subscriber warning device responsive to dialing signals for indicating an incoming call and said hookswitch automatically disconnects said warning device upon operation.

6. In a telecommunication system including first and second stations communicating over a single telephone line by transmission of voice frequencies, the improvement comprising:

third and fourth stations for communicating over said telephone line by transmission of voice modulated first and second carrier frequencies, respectively;

filter means connecting said third and fourth stations to said telephone line for passing frequencies only in the range of said first and second carrier frequencies;

synchronizing means included in said third and fourth stations for synchronizing said first and second carrier frequencies; and control means for rendering said third and fourth stations active only in response to manual activation at the station or receipt of carrier modulation significant of an incoming call.

7. A system as defined in claim 6 wherein each of said third and fourth stations includes a carrier frequency transmitter and a carrier frequency receiver connected to one end of said telephone line via said filter means.

8. A system as defined in claim 7 wherein said carrier frequency transmitter in said third station is normally inactive, and said control means includes first switch means in said third station responsive to dialing impulses originating in said third station for activating said carrier frequency transmitter therein.

9. A system as defined in claim 8 wherein said synchronizing means includes control signal generating means in said carrier frequency receiver of said fourth station responsive to receipt of said first carrier frequency for generating a control signal in synchronism therewith at said second carrier frequency, the carrier frequency transmitter of said fourth station including a generator of said second carrier frequency synchronized by said control signal.

10. A system as defined in claim 11 wherein said synchronizing means further includes second switch means in said third station responsive to receipt of said second carrier frequency for activating the carrier frequency transmitter in said third station.

11. A system as defined in claim 9 wherein said carrier frequency transmitter in said third station is normally inactive, and said control means includes first switch means in said third station responsive to dialing impulses originating in said third station for activating said carrier frequency transmitter therein.

12. A system as defined in claim 7 wherein said carrier frequency transmitter in said fourth station is normally inactive, and said control means includes hookswitch means in said fourth station for activating said carrier frequency transmitter therein upon release thereof.

13. A system as defined in claim 12 wherein said fourth station includes warning means for indicating receipt of an incoming call and detecting means responsive to receipt of dialing impulses at said first carrier frequency for actuating said warning means.

14. A system as defined in claim 13 wherein said hookswitch means selectively connects a source of potential either to said warning means in the normal position thereof or to said carrier frequency transmitter of said fourth station in the released position thereof.

15. A system as defined in claim 14 wherein said source of power is a rechargeable battery connected via a rectifier to said filter means so as to be held charged by the current drawn through said filter means.

16. A system as defined in claim 15 wherein each of said carrier frequency receivers includes a detector for detecting voice frequency signals on said carrier modulated signals, said fourth station including a capacitor connected to the detector therein for transmitting dialing impulses to said warning means to effect actuation thereof.

17. A system as defined in claim 16 wherein said synchronizing means includes control signal generating means in said carrier frequency receiver of said fourth station responsive to receipt of said first carrier frequency for generating a control signal in synchronism therewith at said second carrier frequency, the carrier frequency transmitter of said fourth station including a generator of said second carrier frequency synchronized by said control signal.

18. A system as defined in claim 17 wherein said synchronizing means further includes second switch means in said third station responsive to receipt of said second carrier frequency for activating the carrier frequency transmitter in said third station.

19. A system as defined in claim 18 wherein said second switch means includes contacts connecting voice frequency signals applied to the transmitter therein back to the output of the receiver therein.

20. A system as defined in claim 19 wherein said third station includes a termination element connected to pass voice frequency signals to the carrier frequency transmitter therein and to pass the output of said receiver therein to a subscriber terminal.